(12) United States Patent
Flatt

(10) Patent No.: US 7,981,979 B2
(45) Date of Patent: Jul. 19, 2011

(54) SILOXANE CROSS-LINKED DEMULSIFIERS

(75) Inventor: Austen K. Flatt, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 718 days.

(21) Appl. No.: 11/858,602

(22) Filed: Sep. 20, 2007

(65) Prior Publication Data

US 2008/0076839 A1    Mar. 27, 2008

Related U.S. Application Data

(63) Continuation-in-part of application No. 11/534,408, filed on Sep. 22, 2006, now abandoned.

(51) Int. Cl.
*B01D 17/05* (2006.01)
*C08F 283/06* (2006.01)
*C08L 61/14* (2006.01)
*C10G 33/04* (2006.01)
*C08L 61/10* (2006.01)

(52) U.S. Cl. ......... 525/480; 525/504; 528/25; 516/144; 210/708; 208/188

(58) Field of Classification Search .................. 516/144; 525/480, 504; 528/25; 210/708; 208/188
See application file for complete search history.

(56) References Cited

U.S. PATENT DOCUMENTS

| | | | | |
|---|---|---|---|---|
| 2,182,208 A | * | 12/1939 | Nason | 524/313 |
| 2,425,845 A | * | 8/1947 | Toussaint et al. | 568/613 |
| 2,790,777 A | * | 4/1957 | Kirkpatrick et al. | 516/144 |
| 3,455,725 A | * | 7/1969 | Bailey et al. | 427/214 |
| 3,847,860 A | * | 11/1974 | Seiler et al. | 524/262 |
| 4,172,186 A | * | 10/1979 | Scott et al. | 516/18 |
| 4,183,820 A | * | 1/1980 | Theile et al. | 516/144 |
| 4,382,852 A | * | 5/1983 | McCoy et al. | 208/188 |
| 5,166,243 A | | 11/1992 | Neale | |
| 6,103,100 A | * | 8/2000 | Hart | 208/47 |
| 6,221,815 B1 | | 4/2001 | Grabowski et al. | |
| 6,448,331 B1 | * | 9/2002 | Ioka et al. | 524/859 |
| 6,780,934 B2 | * | 8/2004 | Doi et al. | 525/479 |
| 2006/0036057 A1 | | 2/2006 | Lang | |
| 2007/0100002 A1 | * | 5/2007 | Leinweber et al. | 516/179 |
| 2008/0076840 A1 | * | 3/2008 | Flatt | 516/144 |

FOREIGN PATENT DOCUMENTS

WO    WO 2004108863 A1  *  1/2005

* cited by examiner

*Primary Examiner* — Daniel S Metzmaier

(74) *Attorney, Agent, or Firm* — Edward O. Yonter; Michael B. Martin

(57) ABSTRACT

A composition comprising one or more siloxane cross-linked demulsifiers wherein said siloxane cross-linked demulsifiers are prepared by reacting one or more alkylphenol-formaldehyde resin alkoxylates, one or more polyalkylene glycols, or a mixture thereof, with up to about 1.0 molar equivalents of one or more silicon-based cross-linkers of formula $R_1R_2R_3R_4Si$ wherein $R_1$, $R_2$, $R_3$, $R_5$, $R_6$ and $R_7$ are independently selected from H, Cl, $C_1$-$C_4$ alkyl and $C_1$-$C_4$ alkoxy; $R_4$. is selected from H, Cl, $C_1$-$C_4$ alkyl, $C_1$-$C_4$ alkoxy and a group of formula $L_1SiR_5R_6R_7$; $L_1$ is absent or is selected from —O—, arylene and $C_1$-$C_{12}$ alkylene, optionally interrupted by one or more —O— or —N($R_8$)—; and $R_8$ is H or $C_1$-$C_4$ alkyl and a method of using the demulsifier composition to resolve water-in-oil emulsions.

8 Claims, No Drawings

SILOXANE CROSS-LINKED DEMULSIFIERS

CROSS REFERENCE TO RELATED APPLICATIONS

This is a continuation-in-part of application Ser. No. 11/534,408, filed Sep. 22, 2006, now abandoned.

TECHNICAL FIELD

This invention relates to compositions and methods of resolving water-in-oil emulsions. More particularly, this invention concerns demulsifer compositions comprising siloxane cross-linked alkylphenol-formaldehyde resin alkoxylates and/or polylakylene glycols and use of the compositions to resolve water-in-oil emulsions, particularly emulsions of water in crude oil.

BACKGROUND OF THE INVENTION

Crude oil produced from geological formations can contain various amounts of water. Water and crude oil are naturally non-miscible. However, when naturally occurring interfacial active compounds are present, these compounds can aggregate at the oil and water interface and cause water to form droplets within the bulk oil phase. During crude oil lifting through production tubings, the oil and water encounter an increased mixing energy from rapid flow through chokes and bends. This additional mixing energy can emulsify the oil and water. This oil external, water internal two phase system is commonly referred to as crude oil emulsion. This emulsion can be quite stable. However, the presence of water in crude oil can interfere with refining operations, induce corrosion, increase heat capacity and reduce the handling capacity of pipelines and refining equipment. Therefore, the crude oil that is to be shipped out of the oilfield should be practically free of water and usually has a maximum water content limit of about three percent, depending on the type of crude and oil company.

The emulsified water can also contain various amounts of salts. These salts are detrimental to crude oil refining processes due to potential corrosion in the refinery. In crude oil refining, desalting techniques comprise the deliberate mixing of the incoming crude oil with a fresh "wash water" to extract the water soluble salts and hydrophilic solids therefrom.

Primary dehydration of the crude oil occurs in oil field water oil separation systems such as "free water knock out" and "phase separators". Quite often these systems are not adequate for efficient separation due to factors such as over production, unexpected production changes and system underdesigns. In these cases, emulsion breaking chemicals are added to the production processes to assist and promote rapid water oil separations.

Commonly used emulsion breaking chemicals include alkylphenol formaldehyde resin alkoxylates (AFRA), polyalkylene glycols (PAG), organic sulfonates, and the like. These compounds, however, may not provide satisfactory performance in all instances. Accordingly, there is an ongoing need for new, economical and effective chemicals and processes for resolving emulsions into their component parts of oil and water or brine.

SUMMARY OF THE INVENTION

This invention is a composition comprising one or more siloxane cross-linked demulsifiers wherein said siloxane cross-linked demulsifiers are prepared by reacting one or more alkylphenol-formaldehyde resin alkoxylates, one or more polyalkylene glycols, or a mixture thereof with up to about 1.0 molar equivalents of one or more silicon based cross linkers of formula $R_1R_2R_3R_4Si$ wherein $R_1$, $R_2$, $R_3$, $R_5$, $R_6$ and $R_7$ are independently selected from H, Cl, $C_1$-$C_4$ alkyl and $C_1$-$C_4$ alkoxy; $R_4$ is selected from H, Cl, $C_1$-$C_4$ alkyl, $C_1$-$C_4$ alkoxy and a group of formula $L_1SiR_5R_6R_7$; $L_1$ is absent or is selected from —O—, arylene and $C_1$-$C_{12}$ alkylene, optionally interrupted by one or more —O— or —N($R_8$)—; and $R_8$ is H or $C_1$-$C_4$ alkyl.

The siloxane cross-linked demulsifiers of this invention can improve the performance of currently used demulsifers by providing more rapid water separation as well as lower basic sediments and water (BS&W) in the shipping crude.

DETAILED DESCRIPTION OF THE INVENTION

The siloxane cross-linked demulsifiers of this invention are prepared by reacting one or more alkylphenol-formaldehyde resin alkoxylates, one or more polyalkylene glycols, or a mixture thereof, with up to about one molar equivalent of a silicon-containing cross-linker of formula

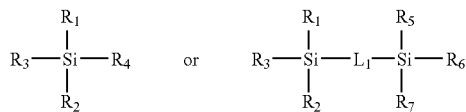

where $R_1$-$R_7$ are independently selected from H, Cl, $C_1$-$C_4$ alkyl and $C_1$-$C_4$ alkoxy and $L_1$ is absent or is selected from —O—, arylene and $C_1$-$C_{12}$ alkylene, optionally interrupted by one or more —O— or —N($R_8$)—; and $R_8$ is H or $C_1$-$C_4$ alkyl. Silicon-containing cross-linkers as described herein are commercially available from multiple vendors including Aldrich, Milwaukee, Wis.

As used herein, the term "alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkoxy" and "alkoxyl" mean an alkyl group, as defined above, attached to the parent molecular moiety through an oxygen atom. Representative alkoxy groups include methoxy, ethoxy, propoxy, butoxy, and the like.

"Alkylene" means a divalent group derived from a straight or branched chain saturated hydrocarbon by the removal of two hydrogen atoms, for example methylene, 1,2-ethylene, 1,1-ethylene, 1,3-propylene, 2,2-dimethylpropylene, and the like.

"Aryl" means a divalent group derived from substituted and unsubstituted aromatic carbocyclic radicals and substituted and unsubstituted heterocyclic aromatic radicals comprising to about 14 ring atoms by the removal of two hydrogen atoms. Representative carbocyclic and heterocyclic aromatic radicals include, but not limited to, phenyl, 1-naphthyl or 2-naphthyl, fluorenyl, pyridyl, quinolyl, thienyl, thiazolyl, pyrimidyl, indolyl, and the like. The arylene may be substituted by one or more $C_1$-$C_4$ alkyl, $C_1$-$C_4$ alkoxy or halogens or a combination thereof.

"Halogen" means Br, Cl, F and I.

The formation of representative siloxane cross-linked demulsifiers (1) is shown in Scheme 1, below, where $R_7$ and $R_8$ are independently H or $CH_3$, n and m can be any integer based on the degree of alkoxylation of the demulsifier, $R_1$-$R_4$ are defined herein, A is the alkylphenol-formaldehyde or polyalkylene glycol portion of the demulsifier and z is 1-4. In the siloxane cross-linked demulsifier of formula (1), the remaining three bonds to the silicon atom (not shown) may be either additional demulsifier residues (i.e. z=2-4) or unreacted groups $R_1$-$R_4$.

Scheme 1

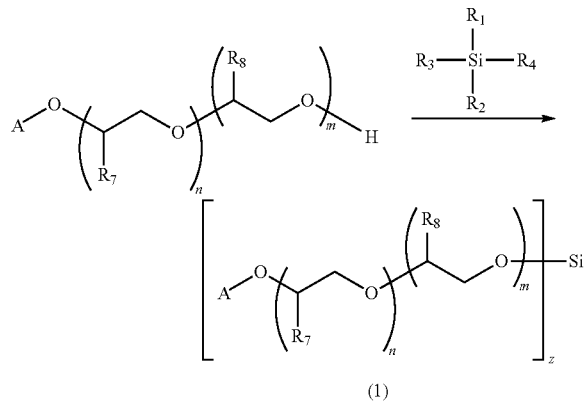

(1)

If too much silicon-containing cross-linker is used in the reaction described herein, the resulting composition gels as a result of excessive cross linking. Accordingly, the amount of siloxane compound used may be empirically determined as the amount required to impart the desired demulsifying characteristics to the composition while simultaneously avoiding gelling of the composition.

The reaction may be conducted by combining the alkylphenol-formaldehyde resin alkoxylates or polyalkylene glycols with a catalytic amount of acid in a suitable solvent followed by addition of the silicon-containing cross-linker and heating to a temperature of about 125° C. for about 3 hours. During the reaction, the mixture is purged with nitrogen gas to remove ethanol.

Sulfuric acid is generally used as the catalyst for this reaction at <0.1% by weight, although others could be used.

Suitable solvents include aliphatic solvents such as kerosene and diesel and aromatic solvents such as xylene, toluene and light or heavy aromatic naphtha. Aromatic solvents are preferred.

The resulting siloxanes comprise a mixture of mono-, di-, tri-, or tetra-siloxanes as shown in Scheme 1 where the proportion of these components depends on the reaction conditions. In addition, cross-linked species can exist depending on the amount of reacting components.

Accordingly, in an embodiment, this invention is a method of preparing a siloxane cross-linked demulsifier comprising reacting one or more alkylphenol-formaldehyde resin alkoxylates, one or more polyalkylene glycols, or a mixture thereof, with up to about 1.0 molar equivalents of one or more silicon-containing cross-linkers of formula $R_1R_2R_3R_4Si$ wherein $R_1$, $R_2$, $R_3$, $R_5$, $R_6$ and $R_7$ are independently selected from H, Cl, $C_1$-$C_4$ alkyl and $C_1$-$C_4$ alkoxy; $R_4$ is selected from H, Cl, $C_1$-$C_4$ alkyl, $C_1$-$C_4$ alkoxy and a group of formula $L_1SiR_5R_6R_7$; $L_1$ is absent or is selected from —O—, arylene and $C_1$-$C_{12}$ alkylene, optionally interrupted by one or more —O— or —N($R_8$)—; and $R_8$ is H or $C_1$-$C_4$ alkyl.

In another embodiment, the cross-linker is selected from compounds of formula $SiH_4$, $SiCl_4$, $Si(R_5)_4$, $Si(OR_6)_4$, $(R_6O)_3Si$—O—$Si(OR_6)_3$, $(R_6O)_3Si$—$Si(OR_6)_3$, $(R_6O)_3Si$—$C_6H_4$—$Si(OR_6)_3$, $(R_6O)_3Si$—$(CH_2)_x$—$Si(OR_6)_3$, $(R_6O)_3$-Si—$(CH_2)_p$—NH—$(CH_2)_q$—$Si(OR_6)_3$, where $R_5$ and $R_6$ are $C_1$-$C_4$ alkyl, x is 1-12 and p and q are independently 1-4.

In another embodiment, the silicon-containing cross-linker is a compound of formula $(CH_3CH_2O)_3Si$—$(CH_2)_3$—NH—$(CH_2)_3$—$Si(OCH_2CH_3)_3$, $Si(OCH_2CH_3)_4$, and $Si(OCH_3)_4$.

In another embodiment, the alkylphenol-formaldehyde resin alkoxylate or polyalkylene glycol is reacted with about 0.01 to about 0.5 molar equivalents of silicon-containing cross-linker.

"Alkylphenol-formaldehyde resin alkoxylate" means the reaction product of one or more alkylphenol-formaldehyde resins as described herein with about 10 to about 500 molar equivalents of ethylene oxide and/or propylene oxide under heat and pressure in the presence of an acid, base or metallic catalyst. A preferred catalyst is potassium hydroxide. Preferably the reaction is conducted at a temperature of about 120° C. to about 180° C. and a pressure of about 80 psi. The reaction may be conducted neat or in a suitable solvent such as xylene, toluene, light or heavy aromatic naphtha, and the like.

In cases where the alkylphenol-formaldehyde resin is reacted with both ethylene oxide and propylene oxide, the ethylene oxide and propylene oxide may be added in random or block fashion.

Random addition of ethylene oxide and propylene oxide involves both components being added to the resin simultaneously, such that the rate of addition to the resin is controlled by their relative amounts and reaction rates. An alkoxylate prepared by random addition of ethylene oxide and propylene oxide or by addition of a mixture of propylene oxide and ethylene oxide is referred to herein as a "mixed copolymer".

In the case of block addition, either the ethylene oxide or propylene oxide is added first to the resin and allowed to react. The other component is then added and allowed to react. An alkoxylate prepared by block addition of ethylene oxide and propylene oxide is referred to herein as a "block copolymer".

In an embodiment, the alkylphenol-formaldehyde resin alkoxylates are selected from nonylphenol-formaldehyde resin alkoxylate, butylphenol-formaldehyde resin alkoxylate, amylphenol-formaldehyde resin alkoxylate, and doedecylphenol-formaldehyde resin alkoxylate and mixtures thereof. In an embodiment, the alkylphenol-formaldehyde resin alkoxylate is nonylphenol-formaldehyde resin alkoxylate.

Alkylphenol-formaldehyde resins are typically prepared by the acid or base catalyzed condensation of an alkylphenol with formaldehyde. Alkyl groups are straight or branched and contain about 3 to about 18, preferably about 4 to about 12 carbon atoms.

Representative acid catalysts include dodecylbenzenesulfonic acid (DDBSA), toluene sulfonic acid, boron trifluoride, oxalic acid, and the like. Representative base catalysts include potassium hydroxide, sodium methoxide, sodium hydroxide, and the like. In an embodiment, the alkylphenol-formaldehyde resins have a molecular weight of about 1,000 to about 50,000. In another embodiment, the alkylphenol-formaldehyde resins have a molecular weight of about 1,000 to about 10,000.

Alkylphenol-formaldehyde resins are well known intermediates used in making alkylphenol-formaldehyde alkoxylate emulsion breakers. They are routinely manufactured by a number of companies including Nalco Company, Naperville, Ill. and Uniqema, a division of ICI, Cleveland, England.

"Polyalkylene glycol" means the reaction product of one or more $C_2$-$C_{12}$ glycols with ethylene oxide and/or propylene oxide. The ethylene oxide and propylene oxide can be added in random or block fashion as described above. The $C_2$-$C_{12}$ glycol may be straight or branched or cyclic and contains from 3 to about 6 hydroxy groups. Representative glycols include glycerol, diethylene glycol, dipropylene glycol, sorbitol, sucrose, glucose, pentaerythritol, and the like. Diethylene glycol and dipropylene glycol are preferred.

In an embodiment, the polyalkylene glycols are selected from $C_2$-$C_{12}$ glycol base polyethylene glycols, $C_2$-$C_{12}$ glycol base polypropylene glycols, $C_2$-$C_{12}$ glycol base polyethylene/polypropylene block copolymers, $C_2$-$C_{12}$ glycol base polyethylene/polypropylene mixed copolymers and $C_2$-$C_{12}$ glycol base cross-linked polyalkylene glycols.

In an embodiment, the polyalkylene glycols have a molecular weight of about 100 to about 100,000. Polyalkylene glycols are commercially available from a variety of suppliers including Nalco Company, Naperville, Ill.

The polyalkylene glycols and alkylphenol-formaldehyde resin alkoxylates may also be cross-linked by reaction with an agent having at least two functionalities capable of reacting with hydroxyl groups. Representative cross linking agents include epoxides such as bisphenol A epichlorohydrin, also known as 4'4-isopropylidenediphenol-Epichlorohydrin Resin, available from Ashland Chemical Company, Columbus, Ohio, and isocyanates such as toluene 2,4-diisocyanate, available from Arco Chemical Company, Newtown Square, Pa., and the like. In an embodiment, the cross-linking agent is bisphenol A epichlorohydrin.

The siloxane cross-linked demulsifiers of this invention are effective for resolving a broad range of hydrocarbon emulsions encountered in crude oil production, refining and chemical processing. Typical hydrocarbons include crude oil, refined oil, bitumen, condensate, slop oil, distillates, fuels and mixtures thereof. The demulsifers are also useful for resolving emulsions in butadiene, styrene, acrylic acid, and other hydrocarbon monomer process streams.

In an embodiment, the siloxane cross-linked demulsifiers are used to demulsify water-in-oil emulsions in various production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the siloxane cross-linked demulsifiers.

In the process of resolving crude petroleum oil emulsions of the water-in-oil type, the siloxane cross-linked demulsifiers are brought into contact with or caused to act upon the emulsion to be treated in any of the various methods now generally used in the petroleum industry to resolve or break crude petroleum oil emulsions with a chemical agent.

The siloxane cross-linked demulsifiers may be used alone, in combination with additional siloxane cross-linked demulsifiers or in combination with any of a number of additional demulsifiers known in the art including alcohols, fatty acids, fatty amines, glycols and alkylphenol formaldehyde condensation products. The siloxane cross-linked demulsifiers may also be used in combination with corrosion inhibitors, viscosity reducers and other chemical treatments used in crude oil production, refining and chemical processing.

In a typical application, the siloxane cross-linked demulsifiers and any additional emulsion breaking chemicals are typically blended together in a suitable solvent for application into the emulsion. Representative solvents include xylene, toluene, light or heavy aromatic naphtha, and the like. Each component contributes to different treating characteristics when added to the crude oil emulsion due to their unique chemical properties.

The amount of siloxane cross-linked demulsifiers used depends on the particular crude oil emulsion being treated. Bottle tests as described herein may be conducted on site in order to determine the optimum dose and formulation. In general, the effective amount of siloxane cross-linked demulsifiers ranges from about 50 ppm to 500 ppm based on the volume of crude production.

The siloxane cross-linked demulsifiers are introduced into the crude oil emulsion by injecting beneath the surface into the oil well itself, by injecting into the crude oil at the well-head or by injecting into the crude oil process stream at a point between the well-head and the final oil storage tank. The siloxane cross-linked demulsifiers may be injected continuously or in batch fashion. The injecting is preferably accomplished using electric or gas pumps.

The treated crude oil emulsion is then allowed to stand in a quiescent state until the desired separation into distinct layers of water and oil results. Once separation into distinct layers of water and oil has been effected, various means known in the art can be utilized for withdrawing the free water and separating crude oil.

In a typical process for demulsification of crude oil, a reservoir is provided to hold the composition of the invention in either diluted or undiluted form adjacent to the point where the effluent crude petroleum oil leaves the well. For convenience, the reservoir is connected to a proportioning pump capable of dropwise injecting the demulsifier of the invention into the fluids leaving the well, which then pass through a flow line into a settling tank. Generally, the well fluids pass into the settling tank at the bottom of the tank so that incoming fluids do not disturb stratification of the layers of crude petroleum oil and water which takes place during the course of demulsification.

The foregoing may be better understood by reference to the following examples, which are presented for purposes of illustration and are not intended to limit the scope of this invention.

Example 1

Preparation of a Nonylphenol-Formaldehyde Resin

Nonylphenol (63.31% by weight) and heavy aromatic naphtha (27.69% by weight) are charged to a reactor and heated to 140-155° F. Oxalic acid (0.36% by weight) and ⅓ of the total amount of formaldehyde (2.88% by weight) are then added. The exothermic reaction is maintained at a temperature below 210° F. by cooling. After the exotherm subsides and the reaction temperature reaches about 160° F. a second portion of formaldehyde (2.88% by weight) is added and the reaction temperature is maintained between 160° F. and 210° F. A third portion of formaldehyde (2.88% by weight) is added when the reaction temperature again reaches about 160° F. After all the formaldehyde is added, the reaction mixture is heated at 210° F. for 3 hours and then the temperature is increased to about 440° F. to distill off the water formed in the condensation reaction. The reaction is stopped when the desired molecular weight of 2100-2700 (by GPC) is obtained.

Example 2

Preparation of Nonylphenol-Formaldehyde Resin Alkoxylate (49.6% Propylene oxide, 12.3% Ethylene Oxide)

Nonylphenol-formaldehyde resin (49.59% by weight, prepared as in Example 1) is charged into a reactor followed by 0.91% of heavy aromatic naphtha (0.91% by weight). A 40 psig of nitrogen pad is maintained throughout the reaction period. KOH catalyst solution (0.40% by weight) is then added to the reactor. The reactor is then heated to 150° C. and purged with nitrogen until the moisture content is less than about 0.05%. Premixed ethylene oxide (36.82% by weight) and propylene oxide (12.28% by weight) are then added intermittently in small amounts, while maintaining a temperature of 150-160° C. and pressure not exceeding 70 psig. The reaction is exothermic and cooling is required to keep temperature and pressure in control. The reaction is stopped when all the mixed oxide has been added.

Example 3

Preparation of a Siloxane Cross-Linked Nonylphenol-Formaldehyde Resin Alkoxylate (49.6% Propylene Oxide, 12.3% Ethylene Oxide)

Nonylphenol-formaldehyde resin alkoxylate (99.30% by weight, prepared as in Example 2) is added to a reactor and diluted with 50% by weight heavy aromatic naphtha. The reactor is then warmed to 150° C. and purged with nitrogen for 1 hour to dehydrate. The reaction is cooled to 50° C. and sulfuric acid (0.08% by weight) is added followed by the addition of tetraethoxy silane (0.40% by weight). The reaction is heated to 125° C. for 3 hours and cooled to room temperature. The mixture is diluted with heavy aromatic naphtha (40% by weight) and removed from the flask.

Example 4

Preparation of Diproplyene Glycol Base Polyalkylene Glycol (82% by Weight Propylene Oxide, 16% by Weight Ethylene Oxide)

Dipropylene glycol (1.45% by weight) is charged into a reactor followed by KOH catalyst (0.52% by weight of a 45% aqueous KOH solution). The mixture is dehydrated by heating to 300° F. with repeated vacuum at −7 psig and pressure up at 2 psig for two hours. The reactor is then set to 260° F. and propylene oxide (82.03% by weight) is added at a controlled rate to maintain a temperature of 260-285° F. and 40-110 psig. When all of the propylene oxide has been added, the reaction mixture is heated to 300° F. and ethylene oxide (16.00% by weight) is added at a controlled rate to maintain temperature between 310° F. and 350° F. and 40-72 psig. After all of the ethylene oxide has been added, heating is continued at 310° F. for 30 minutes.

Example 5

Preparation of a Siloxane Cross-Linked Diproplyene Glycol Base Polyalkylene Glycol (82% by Weight Propylene Oxide, 16% by Weight Ethylene Oxide)

Dipropylene glycol base polyalkylene glycol (99.20% by weight, prepared as in Example 4) is added to a reactor and diluted with 50% by weight heavy aromatic naphtha. The reactor is then warmed to 150° C. and purged with nitrogen for 1 hour to dehydrate. The reaction is cooled to 50° C. and sulfuric acid (0.08% by weight) is added followed by the addition of tetraethoxy silane (0.40% by weight). The reaction is heated to 125° C. for 3 hours and cooled to room temperature. The mixture is diluted with heavy aromatic naphtha (40% by weight) and removed from the flask.

Example 6

Preparation of a Bis-Siloxane Cross-Linked Diproplyene Glycol Base Polyalkylene Glycol (82% by Weight Propylene Oxide, 16% by Weight Ethylene Oxide)

Dipropylene glycol base polyalkylene glycol (99.20% by weight prepared as in Example 4) is added to a reactor and diluted with 50% by weight heavy aromatic naphtha. The reactor is then warmed to 150° C. and purged with nitrogen for 1 hour to dehydrate. The reaction is cooled to 50° C. and sulfuric acid (0.08% by weight) is added followed by the addition of bis(triethoxysilylpropyl)amine (0.40% by weight). The reaction is heated to 125° C. for 3 hours and cooled to room temperature. The mixture is diluted with heavy aromatic naphtha (40% by weight) and removed from the flask.

Representative demulsifiers prepared according to the methods described herein are shown in Table 1.

TABLE 1

Representative Demulsifier Compositions

| Demulsifier | Chemistry |
|---|---|
| 1 | Nonylphenol-formaldehyde resin alkoxylate (47.4% PO, 38.8% EO) |
| 2 | Reaction product of nonylphenol-formaldehyde resin alkoxylate (47.4% PO, 38.8% EO) with 1% tetraethoxy silane |
| 3 | Nonylphenol-formaldehyde resin alkoxylate (12.3% PO, 36.8% EO) |
| 4 | Reaction product of nonylphenol-formaldehyde resin alkoxylate (12.3% PO, 36.8% EO) with 1% tetraethoxy silane |
| 5 | Nonylphenol-formaldehyde resin alkoxylate (37% EO) |
| 6 | Reaction product of nonylphenol-formaldehyde resin alkoxylate (37% EO) with 1% tetraethoxy silane |
| 7 | Nonylphenol-formaldehyde resin alkoxylate (53.4% EO) |
| 8 | Reaction product of nonylphenol-formaldehyde resin alkoxylate (53.4% EO) with 1% tetraethoxy silane |
| 9 | Nonylphenol-formaldehyde resin alkoxylate (44.8% EO) |
| 10 | Reaction product of nonylphenol-formaldehyde resin alkoxylate (44.8% EO) with 1.3% tetraethoxy silane |
| 11 | Nonylphenol-formaldehyde resin alkoxylate (44.8% EO) |
| 12 | Reaction product of nonylphenol-formaldehyde resin alkoxylate (44.8% EO) with 1.3% tetraethoxy silane |
| 13 | Diepoxide crosslinked dipropylene glycol base polyalkylene glycol (PPG 4000) with 27% PO and 6.3% EO |
| 14 | Reaction product of diepoxide crosslinked dipropylene glycol base polyalkylene glycol (PPG 4000) with 27% PO and 6.3% EO with 1% tetraethoxy silane |
| 15 | Butylphenol-formaldehyde resin alkoxylate (6.7% PO, 13.3% EO) |
| 16 | Reaction product of butylphenol-formaldehyde resin alkoxylate (6.7% PO, 13.3% EO) with 1% tetraethoxy silane |
| 17 | Nonylphenol-formaldehyde resin alkoxylate (37% EO) |
| 18 | Reaction product of nonylphenol-formaldehyde resin alkoxylate (37% EO) with 1% tetraethoxy silane |
| 19 | Butylphenol-formaldehyde resin alkoxylate (84.4% PO) |
| 20 | Reaction product of butylphenol-formaldehyde resin alkoxylate (84.4% PO) with 1% tetraethoxy silane |
| 21 | Nonylphenol-formaldehyde resin alkoxylate (44.8% EO) |
| 22 | Reaction product of nonylphenol-formaldehyde resin alkoxylate (44.8% EO) with 1.3% tetraethoxy silane |
| 23 | Diepoxide crosslinked dipropylene glycol base polyalkylene glycol (PPG 4000) with 27% PO and 6.3% EO |
| 24 | Reaction product of diepoxide crosslinked dipropylene glycol base polyalkylene glycol (PPG 4000) with 27% PO and 6.3% EO with 1% tetraethoxy silane |
| 25 | Reaction product of diepoxide crosslinked dipropylene glycol base polyalkylene glycol (PPG 4000) with 27% PO and 6.3% EO with 0.4% bis(triethoxysilylpropyl)amine |

Example 6

Testing of Representative Siloxane Cross-Linked Demulsifiers

Crude emulsions are collected and poured into 6-oz prescription bottles to the 100 ml mark. Representative siloxane cross-linked demulsifier treating compositions and non-cross-linked control compositions are added to the bottles and the bottles are agitated to mix the contents. Agitation is then stopped, the contents are allowed to settle and the rate of water separation from oil is observed and recorded. At the end of the testing period, depending on the test requirement, either top oil, interface oil or a composite oil sample is thieved from the bottle and a centrifugation test is performed on the thieved sample to check for basic sediments and water (BS&W—a measure of unresolved emulsion).

The testing parameters, such as temperature, agitation, settling time, vary depending on the actual system. These parameters should be kept as close to the actual production treating system as possible.

Laboratory bottle test data on a sample of crude oil from a single well is shown in Table 2.

TABLE 2[1,2]

| Demulsifier | Dose (ppm) | % Water Drop (min) | | | | | | % W | BS | Slug |
|---|---|---|---|---|---|---|---|---|---|---|
| | | 15 | 30 | 60 | 150 | 210 | 240 | | | |
| 1 | 200 | 12 | 18 | 38 | 50 | 52 | 52 | 30 | 4 | 12 |
| 2 | 200 | 14 | 18 | 40 | 53 | 55 | 55 | 26 | 4 | 10 |
| 3 | 200 | 7 | 9 | 10 | 50 | 51 | 52 | 32.4 | 1.6 | 9.5 |
| 4 | 200 | 9 | 10 | 17 | 55 | 56 | 56 | 29 | 3 | 11 |
| 5 | 200 | 11 | 22 | 40 | 45 | 48 | 48 | 26 | 0 | 24 |
| 6 | 200 | 10 | 19 | 30 | 47 | 50 | 50 | 22 | 0 | 24 |
| 7 | 200 | 7 | 20 | 48 | 49 | 49 | 50 | 27 | 1 | 18 |
| 8 | 200 | 7 | 26 | 55 | 56 | 57 | 57 | 29.5 | 0.5 | 10 |
| 9 | 200 | 8 | 11 | 39 | 58 | 59 | 60 | 18 | 0 | 6 |
| 10 | 200 | 8 | 11 | 37 | 58 | 60 | 60 | 6.5 | 0.25 | 6 |

[1]Sample: water 74; BS 0, Slug 5.
[2]Test time 3 hours; Agitation fast (mechanical stirring), 5 minutes; 155° F.

As shown in Table 2, representative siloxane cross-linked demulsifiers show improved performance compared to non-cross-linked demulsifiers.

Field bottle test data on a sample of crude oil from three fireflood wells is shown in Table 3.

TABLE 3[1,2]

| Demulsifier | Dose (ppm) | % Water Drop | | | | % W | BS | Slug |
|---|---|---|---|---|---|---|---|---|
| | | 10 m | 30 m | 1 h | 3 h | | | |
| 11 | 400 | 1 | 2 | 3 | 6 | 20 | 32 | 40 |
| 12 | 400 | 2 | 4 | 10 | 19 | 20 | 33 | 34 |
| 13 | 400 | 0 | Tr | 0 | 0 | 46 | 10 | 50 |
| 14 | 400 | 1 | 1 | 2 | 2 | 30 | 2 | 30 |

[1]Sample: 3 fireflood wells in equal proportions, water 16; BS 54.4, Slug 40.
[2]Agitation low (mechanical stirring), 5 minutes; 75° F.

As shown in Table 3, siloxane cross-linked materials 12-14 exhibit superior performance compared to non-cross-linked material 11. Superior performing cross-linked demulsifiers are shown in Table 2 (gray) and compared with the non-cross-linked materials. Demulsifier 12 proved to be a better water dropper than the non-cross-linked compound 11 and Demulsifier 14 was superior for breaking unresolved emulsion.

Field bottle test data on a crude oil sample from a single well is shown in Table 4.

TABLE 4[1,2]

| Demulsifier | Dose (ppm) | % Water drop | | | | | Composite Thief | | 80 ml Thief at 5 hrs | | |
|---|---|---|---|---|---|---|---|---|---|---|---|
| | | 10 m | 35 m | 1 h | 3 h | 15 h | Water | Interface | % W | BS | Slug |
| 15 | 200 | 5 | 10 | 10 | 20 | 40 | G | P | | 21 | 59 | 65 |
| 16 | 200 | 1 | 1 | 1 | 1 | 45 | G | — | | 20 | 20 | 62 |
| 17 | 200 | 50 | 55 | 60 | 60 | 62 | G | R | | 8 | 62 | 54 |
| 18 | 200 | 52 | 58 | 59 | 60 | 60 | G | R/p | | 4 | 66 | 45 |
| 19 | 200 | 1 | 1 | 5 | 4 | 10 | G | P | | 20 | 76 | 76 |
| 20 | 200 | 1 | 3 | 5 | 4 | 30 | G | P | | 36 | 24 | 54 |
| 21 | 200 | 0 | 5 | 7 | 20 | 30 | R | — | | 23 | 63 | 66 |
| 22 | 200 | 0 | 30 | 35 | 50 | 60 | Vp | — | | 15 | 55 | 54 |
| 23 | 200 | 40 | 75 | 79 | 80 | 81 | G | R | 6 | 1 | 6 |
| 24 | 200 | 60 | 79 | 80 | 81 | 81 | G | R | 2 | 4.5 | 7 |

[1]Sample: 3 fireflood wells in equal proportions, water 13; BS 67, Slug 80.
[2]Bottles left at 70 F. for 3 hours. At 3 hours the temperature is increased to 120° F. for two hours. At 3 hours bottles inverted 10 times, 5 minutes later assessed for recovery (agitation high, mechanical stirring).

As shown in Table 4, representative siloxane cross-linked demulsifiers outperformed the non-cross-linked materials. All 5 compounds were found to be better water droppers and better dryers than their non-cross-linked counterparts.

Changes can be made in the composition, operation and arrangement of the method of the present invention described herein without departing from the concept and scope of the invention as defined in the following claims:

The invention claimed is:

1. A composition comprising one or more siloxane cross-linked demulsifiers, wherein said siloxane cross-linked demulsifiers are prepared by reacting one or more alkylphenol-formaldehyde resin alkoxylates that is the reaction product of one or more alkylphenol-formaldehyde resins and 20 to about 500 molar equivalents of one or more alkylene oxides, one or more polyalkylene glycols, or a mixture thereof, with about 0.01 to about 0.5 molar equivalents of one or more silicon-based cross-linkers selected from compounds of formula: $Si(OCH_2CH_3)_4$, $Si(OCH_3)_4$, and $(CH_3CH_2O)_3Si—(CH_2)_3—NH—(CH_2)_3—Si(OCH_2CH_3)_3$.

2. The composition of claim 1 wherein the alkylphenol-formaldehyde resin alkoxylate is selected from the group consisting of nonylphenol-formaldehyde resin alkoxylate, butylphenol-formaldehyde resin alkoxylate, amylphenol-formaldehyde resin alkoxylate and dodecylphenol-formaldehyde resin alkoxylate and mixtures thereof.

3. The composition of claim 1 wherein the polyalkylene glycol is selected from the group consisting of: one or more polyethylene glycol reaction products of one or more $C_2$-$C_{12}$ glycols and ethylene oxide, one or more polypropylene glycol reaction products of one or more $C_2$-$C_{12}$ glycols and propylene oxide, one or more polyethylene/polypropylene block copolymer reaction products of $C_2$-$C_{12}$ glycols and ethylene/propylene oxides, and one or more polyethylene/polypropylene mixed copolymer reaction products of $C_2$-$C_{12}$ glycols and ethylene/propylene oxides.

4. The composition of claim 3 wherein the alkylphenol-formaldehyde resin alkoxylate is nonylphenol-formaldehyde resin alkoxylate.

5. The composition of claim 1 wherein the polyalkylene glycol is dipropylene glycol base polyalkylene glycol.

6. The composition of claim 1 wherein the alkylphenol-formaldehyde resin alkoxylates are further cross-linked with bisphenol A epichlorohydrin.

7. A method of resolving a water-in-oil emulsion comprising adding to the emulsion an effective demulsifying amount of the composition of claim 1.

8. The method of claim 7 wherein the water-in-oil emulsion is a crude oil emulsion.

* * * * *